E. F. ANDREAE.
STORAGE BATTERY TERMINAL.
APPLICATION FILED SEPT. 4, 1918.
1,420,675.
Patented June 27, 1922.
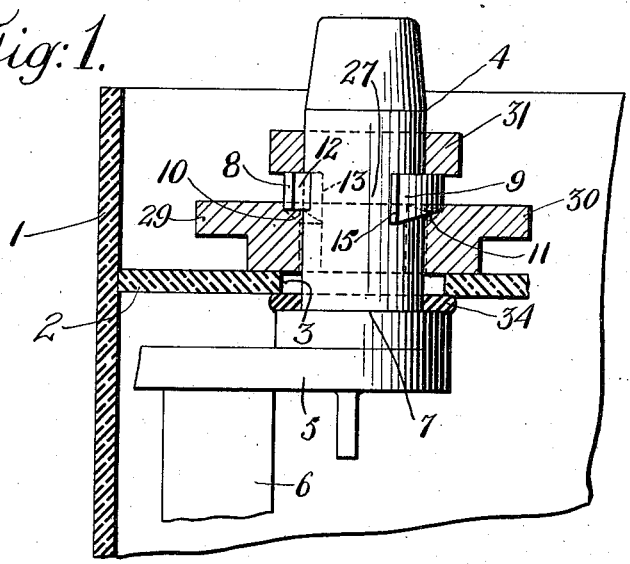
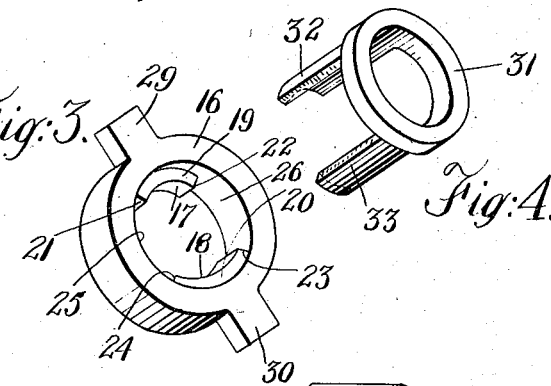
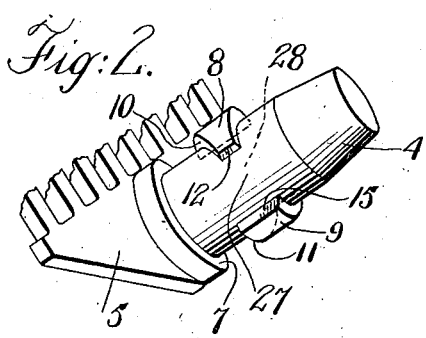
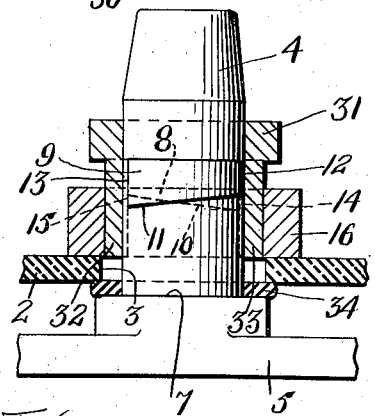
Edward F. Andreae, Inventor
By his Attorney
Thomas Howe

UNITED STATES PATENT OFFICE.

EDWARD F. ANDREAE, OF NEWARK, NEW JERSEY, ASSIGNOR TO GENERAL LEAD BATTERIES COMPANY, A CORPORATION OF DELAWARE.

STORAGE-BATTERY TERMINAL.

1,420,675.  Specification of Letters Patent.  Patented June 27, 1922.

Application filed September 4, 1918. Serial No. 252,525.

*To all whom it may concern:*

Be it known that I, EDWARD F. ANDREAE, a citizen of the United States, residing at city of Newark, county of Essex, and State of New Jersey, have invented new and useful Improvements in Storage-Battery Terminals, of which the following is a specification.

This invention relates to detachable connections which are particularly adapted for use in connection with storage batteries although it may have other uses.

In the usual construction of storage batteries, a number of plates of one polarity is usually connected together and to a post or terminal through which electrical connection with the plates is made. This post or terminal extends through the cover of the jar or receptacle in which the plates and electrolyte of the battery are contained. It is desirable that this cover should be fluid tight and consequently the joint where the terminal passes through the cover, should be made liquid and gas tight. A gasket may be placed against a shoulder on this terminal and a nut placed upon the other side of the cover may serve to force the cover against the gasket so as to seal the joint.

The terminals of storage batteries, are usually leaden, that is have a large percentage of lead in their composition. Where a nut is screw threaded upon a terminal, the slope of the threads must be made within narrow limits in order to secure successful operation, if in fact this can be attained under all circumstances by means of screw threads. The reason for this is that the lead being a soft metal, if the slope of the threads is made so small that the nut will remain tight after it has been screwed up, then the angular engagement of the threaded surfaces is such that it is likely that sufficient force will be exerted to cause the metal of the nut and screw to stick together so that when attempt is made to unscrew the nut, the parts are liable to be mutilated. This sticking together of the metal of the nut and terminal may be prevented by reducing the pressure per square inch between the engaging surfaces below a certain value. It is not feasible however, to indefinitely increase the engaging surfaces of screw threads. For this reason it becomes necessary to limit the slope of the threads in order to prevent the exceeding of the allowable limit of pressure per square inch between the engaging surfaces. It is one object of the present invention to so construct the engaging surfaces whereby the clamping effect of the connection is such that the slope of these surfaces may be made any that is desired without danger of causing the metal, particularly leaden metal, of the clamping means and terminals from sticking together. This is accomplished by providing cam surfaces upon the terminal post which may be made of varying length or depth so as to vary the contacting surface and thereby regulate the pressure per square inch. In this way the pressure per square inch may be brought within any desired limits regardless of the slope of the cam surfaces.

It was further observed above that with a nut in screw threaded engagement with the terminal post, the thread must have its slope within certain limits in order that the nut will stay tight.

It is a further object of the present invention to provide a terminal connection whereby the clamping means will remain in clamping position after it has been set up regardless of the slope of the camming surfaces. This is accomplished by making the camming surfaces of any desired inclination and providing a suitable locking means to prevent unclamping of the device.

A further object of the invention is to provide a terminal wherein the objects as stated above are combined.

Other and ancillary objects of the invention will appear hereinafter.

In the accompanying drawings which illustrate the invention,

Figure 1 is a vertical central section of a terminal connection showing the same in clamping position upon a storage battery;

Fig. 2 is a perspective view of the terminal post;

Fig. 3 is a perspective view of the clamping means for engaging with the terminal post;

Fig. 4 is a perspective view of a locking means for securing the clamping means in clamping position, and Fig. 5 is a vertical central section of a terminal connection embodying the invention, the section being taken at right angles to that shown in Fig. 1.

Referring to the drawings, the receptacle 1 for the storage battery plates and electrolyte, has a cover 2 forming an air tight joint around its periphery with the walls of the receptacle. In the cover 2 is a hole 3 through which projects the leaden post or terminal 4 which is formed integral with the plate 5 to which the shanks as 6 of the battery plates are secured in a well known manner. The plate 5 and the post or stud 4 are usually of antimonious lead such as is used for forming the grids of pasted type storage battery plates and is cast integral with the plate 5. The terminal 4 has formed upon it a shoulder 7 and also has projecting from it the projections 8 and 9, the lower faces 10 and 11 of which are inclined circumferentially of the post 4, the small end of the projections 8 being at 12 and the large end at 13, while the small end of the projection 9 is at 14 and the large end at 15, the surfaces 10 and 11 thus forming cam surfaces engaging with a clamping or securing means as will now be referred to. This clamping or securing means comprises a ring 16 of leaden material, from the interior of which project the projections 17 and 18. The upper faces 19 and 20 of these projections are inclined circumferentially of the ring, the large end of the projection 17 being at 21 and the small end at 22, while the large end of the projection 18 is at 23 and the small end at 24. It will be observed that the projections 17 and 18 on the securing ring are segmental, the recesses 25 and 26 being between the segments. Also the projections 8 and 9 on the terminal post are segmental, having between them a recess 27, a similar recess 28 being between their other ends on the opposite side of the terminal. The recesses and cam projections referred to are of such proportions that the segments 17 and 18 may pass through the recesses 27 and 28 as the ring 16 is pushed longitudinally along the post. By turning the ring 16 in a clockwise direction looking at the top end of the terminal post, the small ends of the projections 17 and 18 will enter respectively under the small ends of the segmental projections 8 and 9 on the terminal post. A still further turning of the ring will cause it to be cammed longitudinally of the post because of the engagement of the inclined surface 19 with the inclined surface 10, also the engagement of the inclined surface 20 with the inclined surface 11. To facilitate the turning of the ring 16, projections 29 and 30 may be formed to extend outward radially from its circumference and form finger holds for the hand of the operator. The ring may be turned until the recesses 25 and 26 are respectively in registry with the recesses 27 and 28 between the segments on the terminal post, or, in other words, until the segments 17 and 18 on the securing ring are in line with the segments 8 and 9 respectively on the terminal post. Reverse turning of the ring may then be prevented by means of the locking device as shown in Fig. 4, which comprises a ring 31 from which extend the projections 32 and 33 having segmental sections. The recesses 25, 26, 27 and 28 having been brought into alignment as specified, the ring 31 is threaded over the end of the terminal post and the projection 32 extends through the recesses 26 and 28, while the projection 33 extends through the recesses 25 and 27. This securely locks the securing ring against turning. To disconnect the terminal, the securing means is withdrawn by simply lifting the device of Fig. 4 off of the terminal post when the securing means is loosened by turning the ring 16 in a counter-clockwise direction as viewed from the top end of the terminal post. When the segments 19 and 20 on the ring 16 have come into registry with the recesses 27 and 28 between the segmental projections on the terminal post, the ring 16 can be moved longitudinally of the terminal and removed therefrom.

In assembling the connection, the rubber gasket 34 is threaded over the terminal post 4 and placed in position upon the shoulder 7. The terminal post is then entered through the hole 3. The securing means as shown in Fig. 3 is then threaded on over the terminal post, its cam projections passing between the cam projections on the terminal post. The cam projections upon the securing ring having passed below the projections on the terminal post, the ring 16 is turned in a clockwise direction viewed from the top of the terminal post, when the ring will be cammed longitudinally of the post and the cover 2 forced firmly upon the gasket 34 so that a fluid tight joint is formed. When the ring 16 has been turned in a clockwise direction sufficiently to produce the desired result, it may be locked in this position by means of the device as shown in Fig. 4, the ring 31 of this device being placed to encircle the terminal post while the segmental projections 32 and 33 pass through the spaces between the segmental projections 8 and 9 and also between the projections 17 and 18, thus locking the ring 16 in its securing position. To disconnect the device, the securing ring as shown in Fig. 4, is removed by simply lifting it off of the terminal post, the ring 19 is turned in the opposite of the securing direction until it is in such position that its segmental projections may pass between those on the terminal post when the ring 16 may also be lifted off.

While the invention has been illustrated in what is considered its best application, it may have other embodiments without departing from its spirit and is not therefore limited to the structure shown in the drawings.

What I claim is—

1. In a detachable connection for a terminal and cover, the combination with a leaden terminal having a flange and segmental cam surfaces, a cover having an opening through which the terminal passes, a securing means comprising a ring having segmental cam surfaces engaging the aforesaid cam surfaces whereby said ring is forced longitudinally of the terminal toward said cover as it is turned, whereby said cover is clamped between said ring and flange, and means for locking said ring in securing position.

2. In a detachable connection for a terminal and cover, the combination with a leaden terminal having a flange and segmental cam surfaces, a cover having an opening through which the terminal passes, a securing means comprising a ring having segmental cam surfaces engaging the aforesaid cam surfaces whereby said ring is forced longitudinally of the terminal as it is turned, said ring also having radial projections from its periphery to afford finger holds for turning said ring, a gasket between said shoulder and ring, and means for locking said ring in securing position.

3. In a detachable connection for a terminal and cover, the combination with a leaden terminal having a flange and segmental cam surfaces projecting from the sides of said terminal, a cover having an opening through which the terminal passes, a securing means comprising a ring having segmental cam surfaces projecting from the interior of said ring and engaging the aforesaid cam surfaces whereby said ring is forced longitudinally of the terminal as it is turned and means extending between the cam projections on the terminal and the cam projections on said ring for locking said ring in securing position.

4. In a detachable connection for a terminal and cover, the combination with a leaden terminal having a flange and segmental cam surfaces projecting from the sides of said terminal, a cover having an opening through which the terminal passes, a securing means comprising a ring encircling said terminal and having segmental cam surfaces projecting from its interior and engaging the aforesaid cam surfaces whereby said ring is forced longitudinally of the terminal as it is turned and means for locking said ring in position comprising a ring encircling said post and having segmental projections extending longitudinally of the terminal and between the cam projections on the terminal and the cam projections on the last mentioned ring.

5. A detachable connection for electrical apparatus comprising in combination a post having a flange and segmental cam surfaces and a clamping means comprising a ring having segmental cam surfaces engaging the aforesaid cam surfaces whereby said ring is forced longitudinally of the terminal as it is turned, and means for locking said ring in clamping position.

6. A detachable connection for electrical apparatus comprising in combination a leaden post having a flange and segmental cam surfaces projecting from its sides, a clamping means comprising a leaden ring having segmental cam surfaces projecting from its interior and engaging the aforesaid cam surfaces whereby said ring is forced longitudinally of the terminal as it is turned and means for locking said ring in clamping position comprising a ring encircling said post and having segmental projections extending longitudinally of said post and between the cam projections on the terminal and the cam projections on the last mentioned ring.

In testimony whereof I have signed this specification this 28th day of August, 1918.

EDWARD F. ANDREAE.